(12) United States Patent
Shibuya et al.

(10) Patent No.: US 10,928,574 B2
(45) Date of Patent: Feb. 23, 2021

(54) POLARIZING PLATE, PRODUCTION METHOD THEREOF AND OPTICAL APPARATUS

(71) Applicant: Dexerials Corporation, Tokyo (JP)

(72) Inventors: Kazuyuki Shibuya, Tokyo (JP); Shigeshi Sakakibara, Tokyo (JP); Toshiaki Sugawara, Tokyo (JP); Yusuke Matsuno, Tokyo (JP); Akio Takada, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/963,442

(22) PCT Filed: May 29, 2019

(86) PCT No.: PCT/JP2019/021256
§ 371 (c)(1),
(2) Date: Jul. 20, 2020

(87) PCT Pub. No.: WO2019/244585
PCT Pub. Date: Dec. 26, 2019

(65) Prior Publication Data
US 2020/0341179 A1    Oct. 29, 2020

(30) Foreign Application Priority Data
Jun. 18, 2018 (JP) .............. JP2018-115158

(51) Int. Cl.
*G02B 5/30* (2006.01)
*G02B 5/22* (2006.01)

(52) U.S. Cl.
CPC .............. *G02B 5/3058* (2013.01); *G02B 5/22* (2013.01)

(58) Field of Classification Search
CPC ........ G02B 5/3058; G02B 5/22; G02B 5/003; G02B 5/1809; G02B 5/207; G02B 5/28; G02B 5/284; G02B 5/285
(Continued)

(56) References Cited

U.S. PATENT DOCUMENTS 8,003,992 B2 * 8/2011 Kim ................... H01L 33/46
257/79
9,798,058 B2 * 10/2017 Probst ..................... G02B 1/08
(Continued)

FOREIGN PATENT DOCUMENTS

CN    101784921 A    7/2010
CN    105388551 A    3/2016
(Continued)

OTHER PUBLICATIONS

Japanese Office Action in corresponding Application No. 2018-115158 dated Aug. 7, 2018 (3 pages).
(Continued)

*Primary Examiner* — Arnel C Lavarias
(74) *Attorney, Agent, or Firm* — Osha Bergman Watanabe & Burton LLP (57) ABSTRACT

Provided is a polarizing plate having an appropriate reflectance characteristic formed from an inexpensive material by an inexpensive production device. In a polarizing plate having a wire grid structure including: a transparent substrate; and a grid-like projection that is arranged on the transparent substrate at a pitch smaller than a wavelength of light in a used band and extends in a predetermined direction, an absorption layer constituting the grid-like projection contains an impurity semiconductor obtained by adding a minute amount of a specific element to an intrinsic semiconductor.

13 Claims, 4 Drawing Sheets

(58) Field of Classification Search
USPC ............ 359/485.05, 487.03; 362/19; 353/20
See application file for complete search history.

(56) References Cited

U.S. PATENT DOCUMENTS

| | | |
|---|---|---|
| 2003/0231161 A1 | 12/2003 | Yamaguchi |
| 2007/0293624 A1 | 12/2007 | Matsumoto et al. |
| 2010/0118222 A1 | 5/2010 | Lee |
| 2010/0141878 A1 | 6/2010 | Takahashi et al. |
| 2011/0198606 A1 | 8/2011 | Oda et al. |
| 2016/0054497 A1 | 2/2016 | Takahashi |
| 2017/0148823 A1 | 5/2017 | Nam et al. |
| 2018/0108851 A1 | 4/2018 | Cheng |

FOREIGN PATENT DOCUMENTS

| | | |
|---|---|---|
| JP | S60-110177 A | 6/1985 |
| JP | 2004-078160 A | 3/2004 |
| JP | 2006-330616 A | 12/2006 |
| JP | 2008-019426 A | 1/2008 |
| JP | 2008-191587 A | 8/2008 |
| JP | 2008-268296 A | 11/2008 |
| JP | 2010-501085 A | 1/2010 |
| JP | 2010-118342 A | 5/2010 |
| JP | 2010-530994 A | 9/2010 |
| JP | 2010-277077 A | 12/2010 |
| JP | 2011-166009 A | 8/2011 |
| JP | 2012-053376 A | 3/2012 |
| JP | 2016-045345 A | 4/2016 |
| JP | 2018-066769 A | 4/2018 |
| WO | 2008/022097 A2 | 2/2008 |
| WO | 2009/002791 A1 | 12/2008 |

OTHER PUBLICATIONS

Japanese Office Action in corresponding Application No. 2018-115158 dated Feb. 19, 2019 (2 pages).
Japanese Office Action in corresponding Application No. 2018-115158 dated Jun. 4, 2019 (2 pages).
Japanese Office Action in corresponding Application No. 2018-115158 dated Oct. 8, 2019 (2 pages).
Chinese Office Action in corresponding Application No. 201980003230.4 dated Jun. 3, 2020 (11 pages).
Office Action issued in Chinese Application No. 201980003230.4, dated Sep. 23, 2020 (9 pages).

* cited by examiner

POLARIZING PLATE, PRODUCTION METHOD THEREOF AND OPTICAL APPARATUS

TECHNICAL FIELD

The present invention relates to a polarizing plate and a production method thereof.

BACKGROUND ART

Conventionally, a wire grid type absorbing polarizing element has been proposed, in which a metal grid having a pitch smaller than a wavelength of light in a used band is formed on a substrate and a dielectric layer and an inorganic particulate layer are formed on the metal grid, thereby canceling light reflected by the metal grid through an interference effect, while transmitting a polarization component.

Owing to the recent enhancement in luminance and definition of liquid crystal projectors, demand is increased for a further reduction in reflectance in such a polarizing element. High reflectance leads to a malfunction of a liquid crystal panel and deterioration of image quality caused by stray light.

The reflectance characteristic of a wire grid type polarizing element is defined by interference between, and light absorption by, layers constituting the grid structure. In this regard, a method has been proposed in which reflectance is controlled by using a material satisfying the requirements for the absorption layer in the grid structure (see Patent Document 1).

As described in Patent Document 1, it is possible to form the grid-like projection from various materials. Given this, production of a polarizing element with low reflectance from an inexpensive material and with lower cost can further satisfy the recent demand in the industry.

Patent Document 1: Japanese Unexamined Patent Application (Translation of PCT Application), Publication No. 2010-530994

DISCLOSURE OF THE INVENTION

Problems to be Solved by the Invention

The present invention has been made in view of the foregoing background art, and an objective of the present invention is to provide a polarizing plate having an appropriate reflectance characteristic formed from an inexpensive material by an inexpensive production device.

Means for Solving the Problems

The present inventors found that, in a polarizing plate having a wire grid structure including: a transparent substrate; and a grid-like projection that is arranged on the transparent substrate at a pitch smaller than a wavelength of light in a used band and extends in a predetermined direction, an absorption layer constituting the grid-like projection containing an impurity semiconductor obtained by adding a minute amount of a specific element to an intrinsic semiconductor enables production of a polarizing plate having an appropriate reflectance characteristic formed from an inexpensive material by an inexpensive production device, and thus completed the present invention.

According to an aspect of the present invention, a polarizing plate having a wire grid structure includes: a transparent substrate; and a grid-like projection that is arranged on the transparent substrate at a pitch smaller than a wavelength of light in a used band and extends in a predetermined direction, in which the grid-like projection includes at least a reflection layer and an absorption layer, and the absorption layer includes an impurity semiconductor.

The impurity semiconductor may be a p-type semiconductor.

The impurity semiconductor may contain a pentavalent element.

The impurity semiconductor may be an n-type semiconductor.

The impurity semiconductor may contain a trivalent element.

An end face of the transparent substrate and the grid-like projection may be an exposed face on which constitutive materials of the transparent substrate and the grid-like projection are exposed.

An electrode may be provided on the exposed face.

In another aspect of the present invention, an optical apparatus includes any of the foregoing polarizing plates.

In yet another aspect of the present invention, a production method of a polarizing plate having a wire grid structure includes: forming a reflection layer on one face of a transparent substrate; and forming an absorption layer on a face of the reflection layer away from the transparent substrate, in which, in the forming of an absorption layer, the absorption layer is formed by sputtering a target constituted of an impurity semiconductor.

The impurity semiconductor may be a p-type semiconductor.

The impurity semiconductor may contain a trivalent element.

The impurity semiconductor may be an n-type semiconductor.

The impurity semiconductor may contain a pentavalent element.

Effects of the Invention

According to the present invention, a polarizing plate having an appropriate reflectance characteristic can be formed from an inexpensive material by an inexpensive production device.

PREFERRED MODE FOR CARRYING OUT THE INVENTION

Hereinafter, embodiments of the present invention are described in detail with reference to the drawings.

Polarizing Plate

The polarizing plate according to the present invention has a wire grid structure, and includes: a transparent substrate; and a grid-like projection that is arranged on the transparent substrate at a pitch (interval) smaller than a wavelength of light in a used band and extends in a predetermined direction. The grid-like projection includes at least a reflection layer and an absorption layer, and the absorption layer contains an impurity semiconductor. It is to be noted that the polarizing plate according to the present invention may include a layer other than the transparent substrate, the reflection layer and the absorption layer, as long as the effects of the invention are produced.

Figure 1:
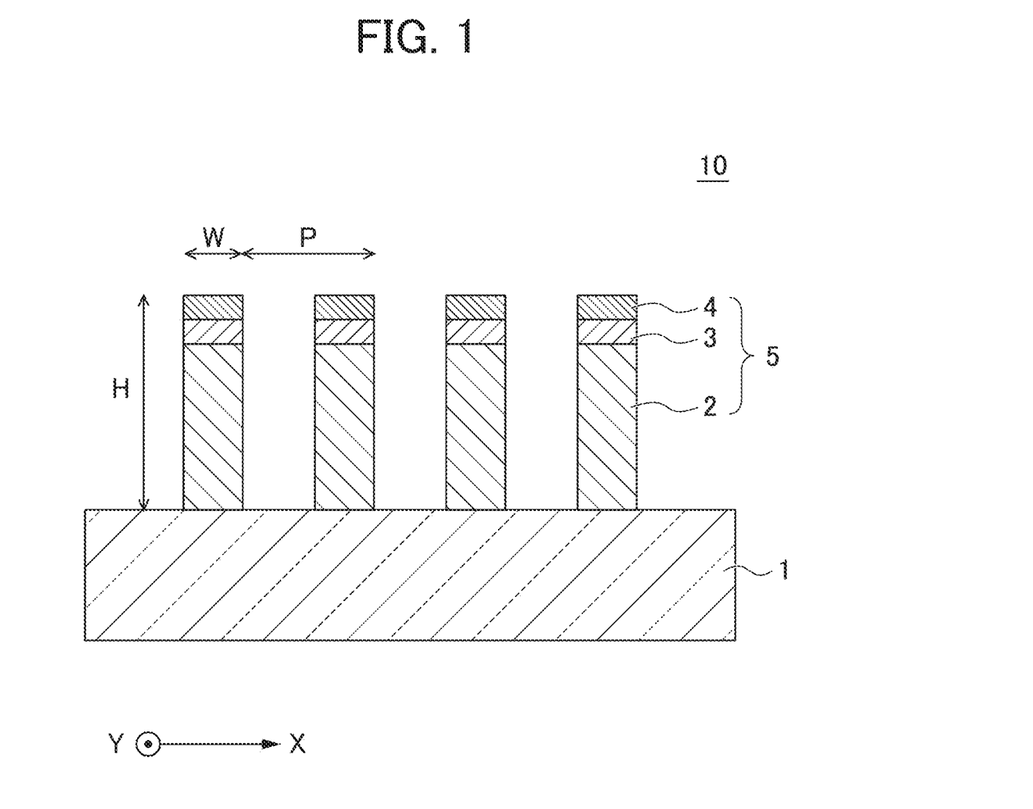
FIG. 1 is a schematic cross-sectional view of a polarizing plate.

FIG. 1 is a schematic cross-sectional view of a polarizing plate 10 according to an embodiment of the present invention. As shown in FIG. 1, the polarizing plate 10 includes: a transparent substrate 1; and a grid-like projection 5 arranged on one face of the transparent substrate 1 at a pitch smaller than a wavelength of light in a used band. The grid-like projection 5 includes a reflection layer 2, a gap layer 3, and an absorption layer 4 in this order from the transparent substrate 1 side. In other words, the polarizing plate 10 has the wire grid structure in which the grid-like projection 5, which is formed by laminating the reflection layer 2, the gap layer 3, and the absorption layer 4 in this order from the transparent substrate 1 side, is arranged in a one-dimensional grid-like shape on the transparent substrate 1.

Herein, the direction (predetermined direction) in which the grid-like projection 5 extends is referred to as "Y-axis direction" as shown in FIG. 1. Meanwhile, the direction in which the grid-like projection 5 is arranged along a principal plane of the transparent substrate 1, i.e., the direction orthogonal to the Y-axis direction, is referred to as "X-axis direction". In this case, light incident on the polarizing plate 10 is incident on the side of the transparent substrate 1 on which the grid-like projection 5 is provided, preferably in a direction orthogonal to the X-axis direction and the Y-axis direction.

The polarizing plate having the wire grid structure attenuates a polarized wave (TE wave (S wave)) having electric field components parallel to the Y-axis direction, while transmitting a polarized wave (TM wave (P wave)) having electric field components parallel to the X-axis direction, through four actions: transmission; reflection; interference; and selective optical absorption of the polarized wave due to the optical anisotropy. Therefore, in FIG. 1, the Y-axis direction corresponds to the direction of absorption axis of the polarizing plate, and the X-axis direction corresponds to the direction of the transmission axis of the polarizing plate.

Light incident on the side of the polarizing plate 10 shown in FIG. 1 on which the grid-like projection 5 is provided is partially absorbed and attenuated when passing through the absorption layer 4 and the gap layer 3. Of the light having passed through the absorption layer 4 and the gap layer 3, the polarized wave (TM wave (P wave)) is transmitted through the reflection layer 2 with high transmittance. On the other hand, of the light having passed through the absorption layer 4 and the gap layer 3, the polarized wave (TE wave (S wave)) is reflected by the reflection layer 2. The TE wave reflected by the reflection layer 2 is partially absorbed when passing through the absorption layer 4 and the gap layer 3, and partially reflected back to the reflection layer 2. In addition, the TE wave reflected by the reflection layer 2 is attenuated through interference when passing through the absorption layer 4 and the gap layer 3. The aforementioned selective attenuation of the TE wave enables the polarizing plate to exhibit the desired polarization characteristics.

The grid-like projection on the polarizing plate according to the present invention has the reflection layer 2, the gap layer 3 and the absorption layer 4 when viewed in the direction in which each one-dimensional grid extends as shown in FIG. 1 (predetermined direction), i.e., in a cross-sectional view orthogonal to the predetermined direction.

The dimensions used herein are described with reference to FIG. 1. The height H refers to a length in the direction perpendicular to the principal plane of the transparent substrate 1 in FIG. 1. The width W refers to a length in the X-axis direction orthogonal to the height direction when viewed in the Y-axis direction along the direction in which the grid-like projection 5 extends. The pitch P refers to an interval of recurrence of the grid-like projection 5 in the X-axis direction when the polarizing plate 10 is viewed in the Y-axis direction along the direction in which the grid-like projection 5 extends.

In regard to the polarizing plate of the present invention, the pitch P for the grid-like projection is not particularly limited as long as the pitch P is smaller than a wavelength of light in a used band. In light of ease and stability of production, the pitch P of the grid-like projection is preferably 100 nm to 200 nm, for example. The pitch P for the grid-like projection can be measured through observation with a scanning electron microscope or a transmission electron microscope. For example, the pitch P for the grid-like projection can be obtained by measuring the pitch P for arbitrary four sites by using a scanning electron microscope or a transmission electron microscope, and calculating an arithmetic average thereof. Hereinafter, the measuring method is referred to as "electron microscope method".

The polarizing plate of the present invention is characterized by the absorption layer, which is included in the grid-like projection, containing an impurity semiconductor. The polarizing plate having an appropriate reflectance characteristic can thus be formed from an inexpensive material by an inexpensive production device.

(Transparent Substrate)

The transparent substrate (transparent substrate 1 in FIG. 1) is not particularly limited as long as it is transparent to light in the used band, and may be appropriately selected according to purpose. The expression "transparent to light in the used band" means not that transmittance of the light in the used band is 100%, but that light transmittance is sufficient for functioning as a polarizing plate. The light in the used band is exemplified by visible light of a wavelength of about 380 nm to 810 nm.

The shape of the principal plane of the transparent substrate is not particularly limited, and an appropriate shape (e.g., rectangular shape) is selected according to purpose. An average thickness of the transparent substrate is preferably 0.3 mm to 1 mm, for example.

The constituent material of the transparent substrate is preferably a material with a refractive index of 1.1 to 2.2 which is exemplified by glass, crystal, sapphire, and the like. Glass, in particular quartz glass (refractive index 1.46) or soda-lime glass (refractive index 1.51), is preferably used in light of cost and light transmittance. The composition of the glass material is not particularly limited and, for example, an inexpensive glass material widely distributed as optical glass such as silicate glass can be used.

Meanwhile, in light of thermal conductivity, crystal or sapphire which is superior in thermal conductivity is preferably used. This provides high light resistance to intense light, and the resulting polarizing plate can be suitably used in an optical engine for a projector that generates a great amount of heat.

It is to be noted that, in the case of using a transparent substrate constituted of optically active crystals such as quartz, the grid-like projection is preferably arranged parallel or vertically to the optical axis of the crystals. Superior optical characteristics are thus obtained. As used herein, "optical axis" means a directional axis along which a difference in refractive index between 0 (ordinary ray) and E (extraordinary ray) of the traveling light is smallest.

(Reflection Layer)

The reflection layer (reflection layer 2 in FIG. 1) is formed on one face of the transparent substrate, in which strip-shaped metal films are arranged so as to extend in the Y-axis direction, which is along an absorption axis. It is to be noted that, in the present invention, another layer may be present between the transparent substrate and the reflection layer.

The reflection layer 2 of the polarizing plate 10 according to an embodiment of the present invention shown in FIG. 1 extends vertically with respect to the plane direction of the transparent substrate 1, and has a rectangular shape when viewed in the direction in which the grid-like projection extends (predetermined direction: Y-axis direction), i.e., in the cross-sectional view orthogonal to the predetermined direction. The reflection layer serves as a wire grid type polarizing element, attenuating a polarized wave (TE wave (S wave)) having electric field components parallel to the longitudinal direction of the reflection layer, while transmitting a polarized wave (TM wave (P wave)) having electric field components orthogonal to the longitudinal direction of the reflection layer.

The constituent material of the reflection layer is not particularly limited as long as the material is reflective to light in the used band, and is exemplified by a simple substance of elements such as Al, Ag, Cu, Mo, Cr, Ti, Ni, W, Fe, Si, Ge and Te, or an alloy containing at least one of the aforementioned elements. Of these, aluminum or an aluminum alloy is preferred as the constituent material of the reflection layer. It is to be noted that, in addition to the aforementioned metal materials, a non-metal inorganic film and a resin film formed to have high surface reflectance through, for example, coloring, may also constitute the reflection layer.

The film thickness of the reflection layer is not particularly limited and is preferably 100 nm to 300 nm, for example. The film thickness of the reflection layer may be measured by, for example, the aforementioned electron microscope method.

The width of the reflection layer depends on the pitch P for the grid-like projection, and is preferably in the range of 30 nm to 40 nm. The width may be measured by, for example, the aforementioned electron microscope method. It is preferred that the width of the reflection layer is substantially the same as the width of the absorption layer and the like described later. In the case in which the width of the reflection layer is different from that of other layers constituting the grid-like projection, a method of changing the balance thereof through a combination of isotropic etching and anisotropic etching is exemplified.

(Gap Layer)

In the present invention, the gap layer (gap layer 3 in FIG. 1) is an optional layer formed on the reflection layer, in which strip-shaped dielectric films are arranged so as to extend in the Y-axis direction, which is along an absorption axis. It is to be noted that, in the present invention, another layer may be present between the reflection layer and the gap layer.

The gap layer 3 of the polarizing plate 10 according to an embodiment of the present invention shown in FIG. 1 is overlaid vertically with respect to the plane direction of the transparent substrate 1, and has a rectangular shape when viewed in the direction in which the grid-like projection 5 extends (predetermined direction: Y-axis direction), i.e., in the cross-sectional view orthogonal to the predetermined direction.

The film thickness of the gap layer is within such a range that the phase of polarized light having passed through the absorption layer and reflected by the reflection layer is shifted by half wavelength with respect to polarized light reflected by the absorption layer. More specifically, the film thickness of the gap layer is appropriately selected within a range of 1 to 500 nm which enables improvement of an interference effect through adjustment of the phase of polarized light. The film thickness of the gap layer may be measured by, for example, the aforementioned electron microscope method.

The constituent material of the gap layer is a material transparent to visible light, for example: Si oxides such as $SiO_2$; metal oxides such as $Al_2O_3$, beryllium oxide, bismuth oxide, etc.; $MgF_2$; cryolite; germanium; titanium dioxide; silicon; magnesium fluoride; boron nitride; boron oxide; tantalum oxide; carbon; a combination thereof; and the like. Of these, the Si oxide is preferred as the constituent material of the gap layer.

The refractive index of the gap layer is preferably greater than 1.0 and no greater than 2.5. Since the optical characteristics of the reflection layer are under influence of the refractive index of the surroundings, the polarization characteristics can be controlled through selection of the material of the gap layer.

In addition, by appropriately adjusting the film thickness and the refractive index of the gap layer, the TE wave reflected by the reflection layer can be partially reflected back to the reflection layer when passing through the absorption layer, and light having passed through the absorption layer can thus be attenuated through interference. As a result of the aforementioned selective attenuation of the TE wave, the desired polarization characteristics can be obtained.

The width of the gap layer depends on the pitch P for the grid-like projection, and is preferably in the range of 30 nm to 40 nm. The width may be measured by, for example, the aforementioned electron microscope method. It is preferred that the width of the gap layer is substantially the same as the width of the aforementioned reflection layer.

(Absorption Layer)

The absorption layer (absorption layer 4 in FIG. 1), which is an essential layer in the present invention, is provided on a face of the reflection layer away from the transparent substrate and constitutes a part of the grid-like projection. In other words, the absorption layer is arranged so as to extend in the Y-axis direction, which is along the absorption axis. In the present invention, a layer other than the gap layer may be present between the reflection layer and the absorption layer.

The absorption layer 4 of the polarizing plate 10 according to an embodiment of the present invention shown in FIG. 1 is overlaid vertically with respect to the plane direction of the transparent substrate 1, and has a rectangular shape when viewed in the direction in which the grid-like projection 5 extends (predetermined direction: Y-axis direction), i.e., in the cross-sectional view orthogonal to the predetermined direction.

The width of the absorption layer depends on the pitch P for the grid-like projection, and is preferably in the range of 30 nm to 40 nm. The width may be measured by, for example, the aforementioned electron microscope method. It is preferred that the width of the absorption layer is substantially the same as the width of the aforementioned reflection layer. In the case in which the width of the absorption layer is different from that of other layers constituting the grid-like projection, a method of changing the balance thereof through a combination of isotropic etching and anisotropic etching is exemplified.

The polarizing plate of the present invention is characterized by the absorption layer containing an impurity semiconductor. The polarizing plate having an appropriate reflectance characteristic formed from an inexpensive material by an inexpensive production device can thus be provided.

The impurity semiconductor contained in the absorption layer is exemplified by an impurity semiconductor obtained by adding an impurity to an intrinsic semiconductor such as Si and Ge. The intrinsic semiconductor is preferably Si in light of availability and price.

The intrinsic semiconductor such as silicon is known to be an n-type semiconductor or a p-type semiconductor through addition of a minute amount of an impurity. For example, in a case of doping silicon with boron, a p-type semiconductor is obtained, of which resistivity is known to be drastically reduced as the doping amount increases.

Since the resistivity of silicon as the intrinsic semiconductor is about $10^3$ Ω·cm, film formation from silicon by sputtering must be done in the high-frequency system. The high-frequency sputtering requires a high-frequency power supply, matching, etc. and typically involves complex device configuration, resulting in a rise in device price and film formation cost.

In this regard, as set forth above, the resistivity of the impurity semiconductor obtained by adding a minute amount of an impurity to an intrinsic semiconductor is drastically reduced. The sputtering can thus be carried out in the direct-current system, of which device configuration is simple. Therefore, the polarizing plate of the present invention with the absorption layer containing the impurity semiconductor enables reduction in both the cost of the manufacturing apparatus itself and the cost of production, through simplification of the film forming device.

It is to be noted that, in the present invention, due to using the semiconductor material for the absorption layer, band-gap energy of the semiconductor influences the absorbing behavior. The band-gap energy must thus be no greater than that of the used band. For example, in the case of using the polarizing plate with visible light, absorption at the wavelength of no less than 400 nm, i.e., a material having a band gap of no greater than 3.1 eV, is required.

The impurity semiconductor used for the absorption layer is not particularly limited as long as the band-gap energy is no greater than that of the used band, and may be either a p-type semiconductor or an n-type semiconductor. In the case of a p-type semiconductor, the impurity to be added to the intrinsic semiconductor is preferably a trivalent element such as B and Al. For example, a minute amount of the trivalent element such as B and Al is added as the impurity to Si. Meanwhile, in the case of an n-type semiconductor, the impurity is preferably a pentavalent element such as P, As and Sb. For example, a minute amount of the pentavalent element such as P, As and Sb is added as the impurity to Si.

The film thickness of the absorption layer is not particularly limited and preferably 10 nm to 100 nm, for example. The film thickness of the absorption layer may be measured by, for example, the aforementioned electron microscope method. The absorption layer may be constituted of two or more layers of different constituent materials.

(Diffusion Barrier Layer)

The polarizing plate of the present invention may also have a diffusion barrier layer between the gap layer and the absorption layer. In other words, in the polarizing plate shown in FIG. 1, the grid-like projection 5 includes the reflection layer 2, the gap layer 3, the diffusion barrier layer, and the absorption layer 4 in this order from the transparent substrate 1 side. The diffusion barrier layer prevents light diffusion in the absorption layer. The diffusion barrier layer may be constituted of a metal film of Ta, W, Nb, Ti, etc.

(Protective Film)

The light-incident face of the polarizing plate of the present invention may be covered with a protective film constituted of a dielectric, to such a degree that the change in the optical characteristics is not influenced. The protective film is constituted of a dielectric film, and may be formed, for example, on the surface of the polarizing plate (face on which the wire grid is formed) by means of CVD (chemical vapor deposition) or ALD (atomic layer deposition). An undue oxidation reaction to the metal film may thus be suppressed.

(Organic Water-Repellent Film)

Furthermore, the light-incident face of the polarizing plate of the present invention may be covered with an organic water-repellent film. The organic water-repellent film is constituted of, for example, a fluorine-based silane compound such as perfluorodecyltriethoxysilane (FDTS), and may be formed by means of aforementioned CVD or ALD. The reliability, such as moisture resistance, of the polarizing plate can thus be improved.

It is to be noted that the present invention is not limited to the foregoing embodiment shown in FIG. 1, and modifications and improvements made within such a scope that the object of the present invention can be attained.

End Face of Polarizing Plate

Figure 2A:
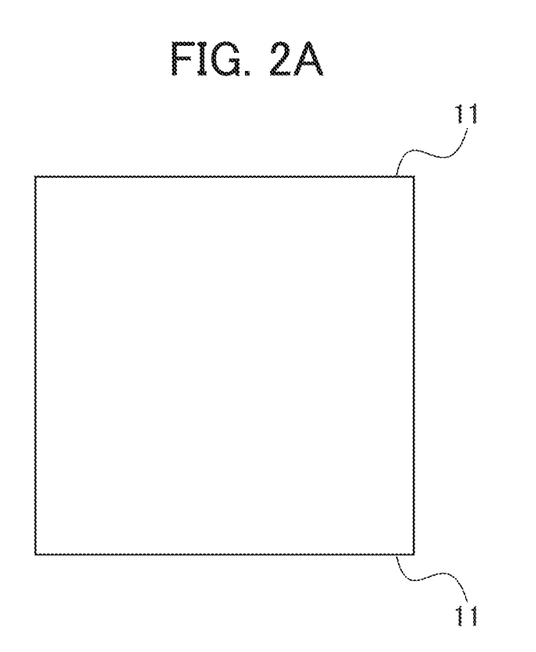
FIGS. 2A and 2B are top views of a polarizing plate according to embodiments of the present invention.

In the polarizing plate of the present invention, it is preferred that an end face of the transparent substrate and the grid-like projection is an exposed face on which constitutive materials of the transparent substrate and the grid-like projection are exposed. In other words, as shown in FIG. 2 (a), given that the arrow direction corresponds to the direction in which the grid-like projection extends, an end face 11 of the grid-like projection and the transparent substrate is an exposed face on which constitutive materials of the transparent substrate and the grid-like projection are exposed.

Figure 2B:
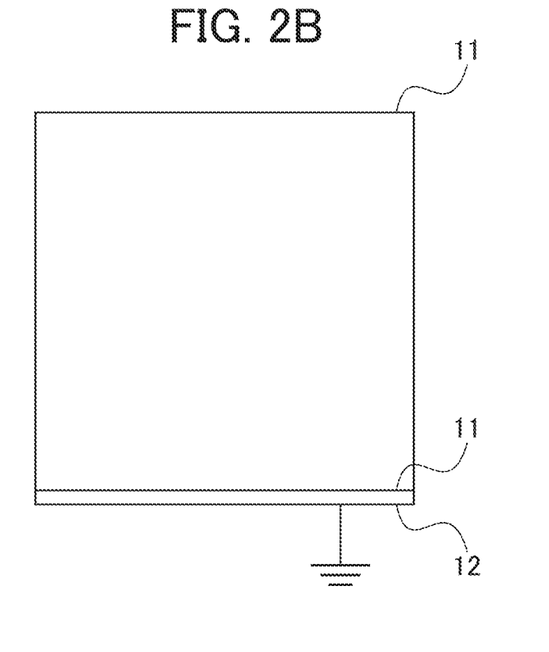

Due to the end face of the polarizing plate being the exposed face on which the constitutive material of the grid-like projection is exposed, in other words, due to the absorption layer containing the impurity semiconductor being exposed, conductive contact from the end face is possible as needed. For example, as shown in FIG. 2 (b), generation of static electricity can be suppressed by providing a contact electrode directly on the end face 11 of the grid-like projection and the transparent substrate, i.e., the exposed face on which the constitutive material of the grid-like projection is exposed, and in turn, even when dust is introduced into an optical apparatus such as a liquid crystal projector, reduction in optical transparency due to the dust on the polarizing plate and corrosion from the dusted region can be inhibited.

Production Method of Polarizing Plate

The production method of the polarizing plate according to the present invention includes, at least, a reflection layer forming step and an absorption layer forming step.

(Reflection Layer Forming Step)

In the reflection layer forming step, the reflection layer is formed on one face of the transparent substrate. The reflection layer can be formed by, for example, sputtering or vapor deposition.

(Absorption Layer Forming Step)

In the absorption layer forming step, the absorption layer is formed on the reflection layer formed in the reflection layer forming step, or, in the case in which an optional layer such as the gap layer is present, on the optional layer.

The present invention is characterized in that, in the absorption layer forming step, the absorption layer is formed by sputtering a target constituted of the impurity semiconductor described above.

(Etching Step)

In the etching step, the grid-like projection, which is arranged on the transparent substrate at a pitch smaller than the wavelength of light in the used band, is formed by selectively etching a laminate formed by the aforementioned layer forming steps. More specifically, a mask pattern in the form of a one-dimensional grid is formed by photolithography or nanoimprint. Then, the grid-like projection, which is arranged on the transparent substrate at a pitch smaller than the wavelength of light in the used band, is formed by selectively etching the laminate. The etching procedure is exemplified by dry etching with an etching gas suitable for the surface to be etched.

Especially in the present invention, the width of the layers constituting the grid-like projection can be adjusted arbitrarily by combining isotropic etching and anisotropic etching, and altering balance of the combination.

The production method of the polarizing plate according to the present invention may include a step of covering the surface of the polarizing plate with the protective film constituted of a dielectric. Furthermore, the production method of the polarizing plate according to the present invention may include a step of covering the surface of the polarizing plate with the organic water-repellent film.

Optical Apparatus

The optical apparatus of the present invention is provided with the aforementioned polarizing plate of the present invention. The polarizing plate of the present invention can be applied to various usages. The optical apparatus to which the polarizing plate can be applied is exemplified by a liquid crystal projector, a head-up display, a digital camera, and the like. In particular, the polarizing plate of the present invention is an inorganic polarizing plate superior in heat resistance, and therefore, compared to an organic polarizing plate constituted of organic materials, can be more suitably used for a liquid crystal projector, a head-up display and the like that require heat resistance.

In the case in which the optical apparatus of the present invention is provided with a plurality of polarizing plates, at least one of the pluralities of polarizing plates is required to be the polarizing plate of the present invention. For example, in the case in which the optical apparatus of the present embodiment is a liquid crystal projector, at least one of the polarizing plates provided respectively on the light-incident side and the light-emitting side of a liquid crystal panel is required to be the polarizing plate of the present invention.

EXAMPLES

Hereinafter, Examples of the present invention are described; however, the present invention is not in any way limited to these Examples.

Example 1

Forming of Polarizing Plate

A wire-grid polarizing plate configured as shown in FIG. 1 was formed. In other words, a polarizing plate was formed, with a grid-like projection arranged in a one-dimensional grid-like shape on one face of a transparent substrate, the grid-like projection having a structure of: the reflection layer; the gap layer; and the absorption layer, in this order from the transparent substrate side.

Glass was used as the substrate, and aluminum was used as a material for the reflection layer. The thickness of the reflection layer was 200 nm. The gap layer was formed from silica, and 20 nm in thickness.

The absorption layer was formed on the gap layer by sputtering. Silicon containing boron at a concentration of 100 ppm was used as the target material. The volume resistivity of the target was 0.01 Ω·cm and the thickness of the absorption layer was 20 nm.

Subsequently, etching was carried out, and thus the wire-grid polarizing plate configured as shown in FIG. 1 was formed in which the pitch of the grid-like projection was 140 nm.

Measurement of Polarization Characteristics

The optical characteristics of the polarizing plate thus obtained were measured by using a spectrophotometer (V-570 available from JASCO Corporation), under the following conditions.

(Measurement Conditions)

Transmittance of p-polarization and s-polarization: measured with a wavelength of 400 to 700 nm, at an angle of incidence of 0°

Reflectance of p-polarization and s-polarization: measured with a wavelength of 400 to 700 nm, at an angle of incidence of 5°

Figure 3:
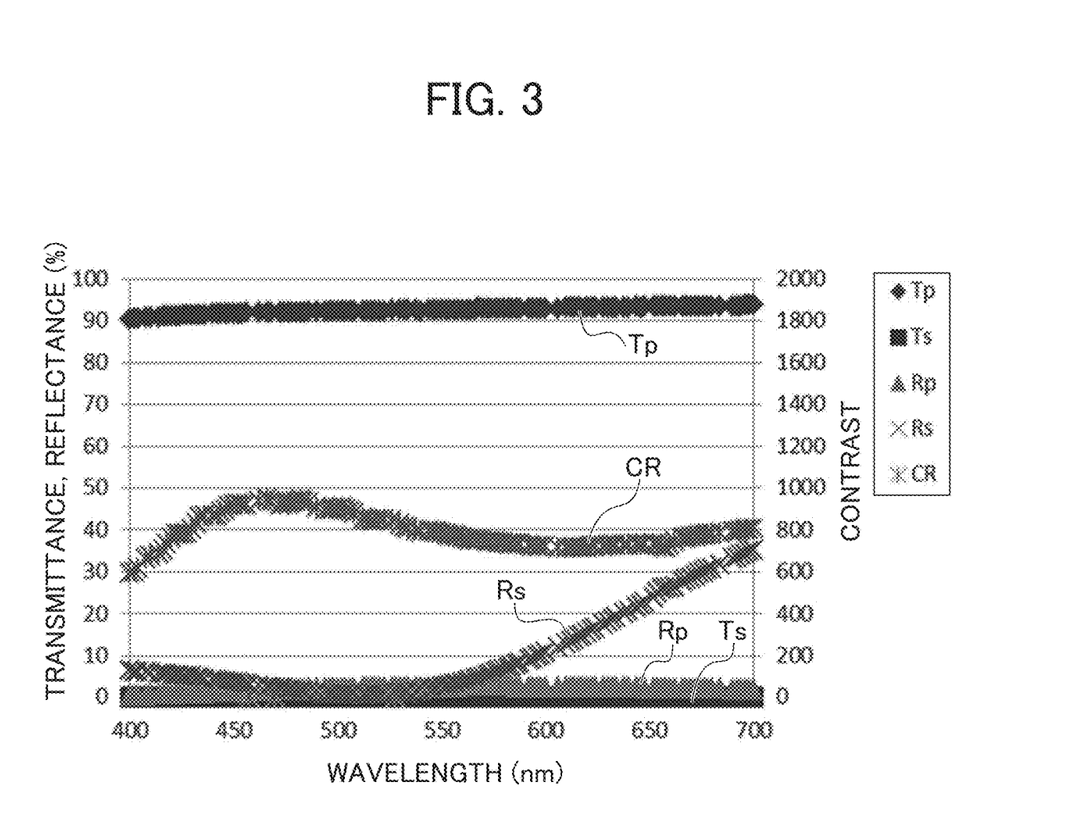
FIG. 3 is a graph showing optical polarization characteristics of the polarizing plate according to Example 1.

Results of examination of polarization characteristics are shown in FIG. 3. It is to be noted that in the graph shown in FIG. 3, the X axis represents wavelength (nm), the Y1 axis represents transmittance or reflectance (%), and the Y2 axis represents contrast. In addition, simulated results of the following characteristics were plotted.

Tp: p-polarization transmittance
Ts: s-polarization transmittance
Rp: p-polarization reflectance
Rs: s-polarization reflectance
CR: contrast (Tp/Ts)

As used herein, the p-polarization transmittance (Tp) indicates transmittance of the polarized wave (TM wave) in the direction of the transmission axis (X axis direction) incident on the polarizing plate. The s-polarization transmittance (Ts) indicates transmittance of the polarized wave (TE wave) in the direction of the absorption axis (Y axis direction) incident on the polarizing plate. The p-polarization reflectance (Rp) indicates reflectance of the polarized wave (TM wave) in the direction of the transmission axis (X axis direction) incident on the polarizing plate. The s-polarization reflectance (Rs) indicates reflectance of the polarized wave (TE wave) in the direction of the absorption axis (Y axis direction) incident on the polarizing plate.

Comparative Example 1

Figure 4:
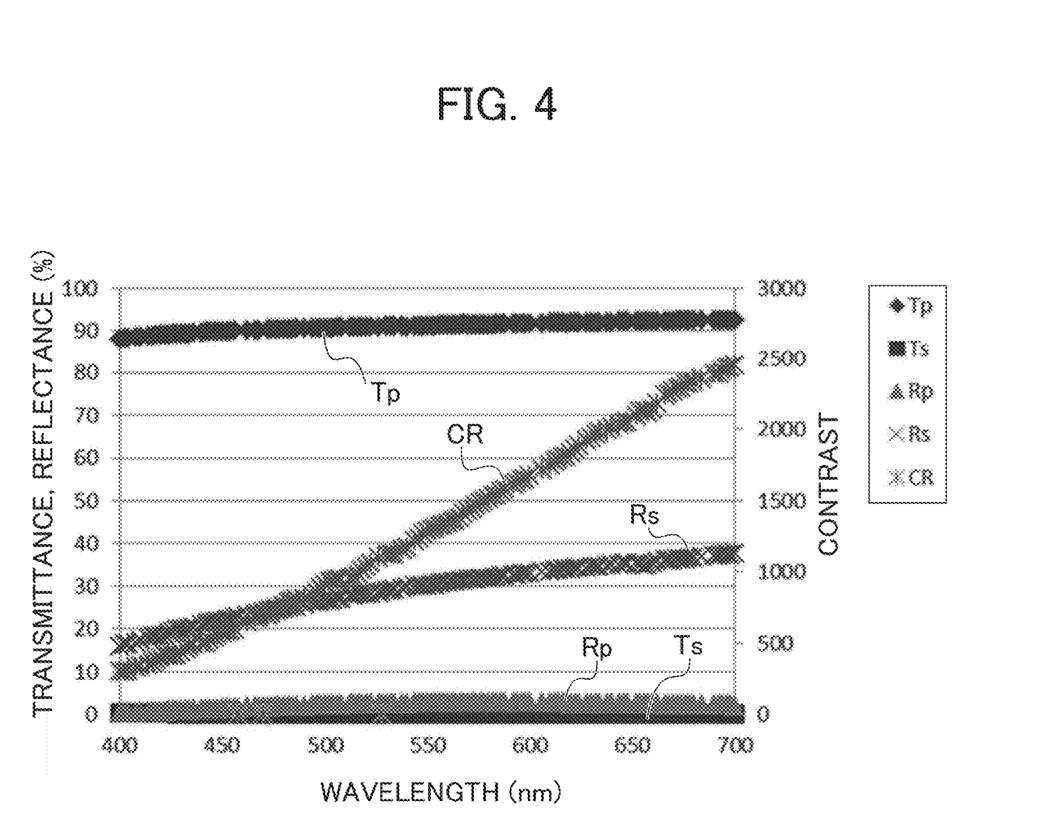
FIG. 4 is a graph showing optical polarization characteristics of the polarizing plate according to Comparative Example 1.

A polarizing plate similar to Example 1 except for including Ta (volume resistivity: 131 nΩ·cm) as the absorption layer was formed, and the simulation was carried out in the same way as in Example 1. Results of examination of polarization characteristics are shown in FIG. 4.

The polarizing plate of Example 1 was proven to have the lower s-polarization reflectance (Rs) in the green band (around 550 nm), which is the important wavelength in the case of using as a polarizing plate for visible light, compared to the polarizing plate of Comparative Example 1.

EXPLANATION OF REFERENCE NUMERALS

10 Polarizing plate
1 Transparent substrate
2 Reflection layer
3 Gap layer
4 Absorption layer
5 Grid-like projection
11 End face of transparent substrate and grid-like projection
12 Contact electrode
H Height of grid-like projection
W Width of grid-like projection
P Pitch of grid-like projection

The invention claimed is:

1. A polarizing plate having a wire grid structure, comprising:
   a transparent substrate; and
   a grid-like projection that is arranged on the transparent substrate at a pitch smaller than a wavelength of light in a used band and extends in a predetermined direction,
   wherein the grid-like projection comprises at least a reflection layer and an absorption layer, and
   the absorption layer is an uppermost layer of the grid-like projection and is a single layer comprising an impurity semiconductor.

2. The polarizing plate according to claim 1, wherein the impurity semiconductor is a p-type semiconductor.

3. The polarizing plate according to claim 2, wherein the impurity semiconductor comprises a trivalent element.

4. The polarizing plate according to claim 1, wherein the impurity semiconductor is an n-type semiconductor.

5. The polarizing plate according to claim 4, wherein the impurity semiconductor comprises a pentavalent element.

6. The polarizing plate according to claim 1, wherein an end face of the transparent substrate and the grid-like projection is an exposed face on which constitutive materials of the transparent substrate and the grid-like projection are exposed.

7. The polarizing plate according to claim 6, wherein an electrode is provided on the exposed face.

8. An optical apparatus comprising the polarizing plate according to claim 1.

9. A production method of a polarizing plate having a wire grid structure, wherein the polarizing plate having a wire grid structure, comprising:
   a transparent substrate; and
   a grid-like projection that is arranged on the transparent substrate at a pitch smaller than a wavelength of light in a used band and extends in a predetermined direction, wherein the grid-like projection comprises at least a reflection layer and an absorption layer, and
   the absorption layer is an uppermost layer of the grid-like projection and is a single layer, comprising:
      forming the reflection layer on one face of the transparent substrate; and
      forming the absorption layer on a face of the reflection layer away from the transparent substrate,
      wherein, in the forming of the absorption layer, the absorption layer is formed by sputtering a target constituted of an impurity semiconductor.

10. The production method according to claim 9, wherein the impurity semiconductor is a p-type semiconductor.

11. The production method according to claim 10, wherein the impurity semiconductor comprises a trivalent element.

12. The production method according to claim 9, wherein the impurity semiconductor is an n-type semiconductor.

13. The production method according to claim 12, wherein the impurity semiconductor comprises a pentavalent element.

* * * * *